United States Patent [19]

Ten Pas

[11] 4,202,497
[45] May 13, 1980

[54] SPRAY GUN

[76] Inventor: Gary C. Ten Pas, R.R.#1, Oostburg, Wis. 53070

[21] Appl. No.: 903,159

[22] Filed: May 5, 1978

[51] Int. Cl.² ............................................. B05B 15/02
[52] U.S. Cl. .................................... 239/112; 239/400; 239/401; 239/527
[58] Field of Search ............... 239/112, 113, 125, 414, 239/415, 527, 528, 400, 401, 403

[56] References Cited

U.S. PATENT DOCUMENTS

| | | | |
|---|---|---|---|
| 3,249,304 | 5/1966 | Faro et al. | 239/112 X |
| 3,504,855 | 4/1970 | Volker | 239/125 X |
| 3,752,398 | 8/1973 | Svensson | 239/112 |
| 3,900,163 | 8/1975 | Volker | 239/112 |

Primary Examiner—John J. Love
Attorney, Agent, or Firm—Clarence A. O'Brien; Harvey B. Jacobson

[57] ABSTRACT

A dispensing apparatus is provided for mixing and spraying A and B components of urethane foam plastic whereby urethane foam plastic may be sprayed in place. The gun includes structure whereby a solvent for the A and B components may be readily utilized to thoroughly flush the A and B component valves, the mixing chamber and the mixer for the discharge nozzle and is further constructed in a manner whereby the material handling valves will not be distorted by the materials handled thereby and the gun may be temporarily shutdown for short periods or overnight without the need to turn the flow selectors for the components A and B to the off positions thereof. Further, the gun is constructed in a manner whereby the control valves are simultaneously actuatable and the flow selectors and the rotation limiting slots thereof may be lubricated to prevent drying out of the A and B components during an overnight shutdown of the gun preventing the flow selectors from being turned. Still further, the gun has been designed in a manner to enhance durability, lessen the need for extensive maintenance and to enhance smoothness of operation.

8 Claims, 29 Drawing Figures

SPRAY GUN

BACKGROUND OF THE INVENTION

A spray gun (dispensing apparatus) presently in use and similar in many general respects to the gun of the instant invention is disclosed in U.S. Pat. Nos. 3,900,163 and other pertinent dispensing apparatuses are disclosed in U.S. Pat. Nos. 3,920,188, 3,717,306, 3,087,682, 3,235,186, 3,240,432, 3,399,837, 3,504,855, 3,587,970, 3,606,170, 3,687,370, 3,708,123, 3,837,575 and 3,958,757.

These various dispensing apparatuses are for the most part designed to mix and spray discharge a plurality of fluent materials and each is particularly well adapted, in at least certain manners, to mix and spray discharge the particular types of fluent materials for which these dispensing apparatuses have been designed to handle. Those dispensing apparatuses designed to mix and spray discharge two or more chemically reactive fluid components, for various reasons, are not fully dependable in operation, without extensive maintenance, for the purpose of mixing and spray discharging A and B components of urethane foam plastic. Accordingly, a need exists for an efficient urethane foam plastic spray gun which will be efficient in performing its intended function and which will have an extended operational life independent of more than minimal maintenance.

BRIEF DESCRIPTION OF THE INVENTION

The spray gun of the instant invention has been specifically designed for mixing and spray discharging the A and B components of urethane foam plastic, but may also be utilized to admix and spray discharge, as a homogeneous mixture, other chemically reactive fluid components.

The main object of this invention is to provide a spray gun which will be capable of admixing and spray discharging, in an efficient manner, the A and B components of urethane foam plastic.

Another object of this invention is to provide a spray gun including improved means for flushing the control valves and the nozzle of the gun with a solvent.

Still another object of this invention is to provide a spray gun capable of recirculating material flow through the gun, whereby the very first drop of material that is sprayed is at the correct temperature and ratio, so that the operator gets the most yield from his raw material. Maintaining the proper temperature not only affects the reactivity of the components but also affects the ability of the materials to flow through the hoses, inasmuch as the viscosity of the materials changes rapidly with temperature variations.

Another object of the invention is to provide material dispensing valves capable of performing double duty as check valves, thereby preventing material from entering the return line or backing up the solvant line and also preventing material from flowing back out of the return material line which would throw the ratio off.

Yet another object of the invention is to provide a gun with sufficiently high air flow that provides the material being sprayed with a protective warm air "blanket", which "blanket" prevents loss of the necessary exothermic reaction heat to escape into the ambient air temperature.

Another object of the invention is to provide a gun with sufficiently high air flow through the nozzle to purge the nozzle, preventing accumulation of material in said nozzle. Also, the nozzle has a slip surface finish treatment which reduces accumulation.

Still another important object of this invention is to provide a spray gun including means for lubricating the flow selectors thereof.

Yet another important object of this invention is to provide an improved air valve and impingement chamber sleeve for admixing and spray discharging the A and B components from the gun.

A further object of this invention is to provide a spray gun in accordance with the preceding objects and constructed in a manner whereby temporary shutdown of the gun or overnight shutdown of the gun may be accomplished without the need to turn the flow selectors to the off position.

Still another important object of this invention is to provide a spray gun including structure whereby solvent utilized to flush the gun after use thereof may be trapped within the gun.

A further object of this invention is to provide a gun in accordance with the preceding objects and constructed in a manner whereby the control valves thereof may be simultaneously actuated by a single trigger.

A final object of this invention to be specifically enumerated herein is to provide a spray gun in accordance with the preceding objects and which will conform to conventional forms of manufacture, be of simple construction and dependable in operation independent of more than minimal maintenance, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 28 is a side elevational view of one of the flushing valve pistons with parts thereof being broken away and illustrated in longitudinal vertical section; and.

DETAILED DESCRIPTION OF THE INVENTION

Referring now more specifically to FIGS. 1–6 of the drawings, the numeral 10 generally designates the spray gun of the instant invention. The spray gun 10 includes a body 12 constructed of aluminum and having a forward T-shaped cavity 14 formed in its forward end. The upper portion of the T-shaped cavity 14 includes an enlargement 16 and opposite side vertically central portions of the body 12 include bores 18 formed longitudinally therethrough. The rear ends of the bores 18 include enlarged counterbores 20 and the forward ends of the bores 18 include enlarged counterbores 22. The counterbores 22 open into the cavity 14 and the enlargement 16. In addition, the upper central portion of the body 12 includes a longitudinal bore 24 formed longitudinally therethrough and the rear end of the bore 24 includes a first enlarged smooth counterbore 26 and a second threaded counterbore 28. The forward of the bore 24 includes a first threaded counterbore 30 and a second smooth counterbore 32.

The body 12 also includes a forward transverse bore 34 opening, centrally intermediate its opposite ends, into the cavity 14 and including a diametrically reduced threaded end portion 36 on the right side of the body 12. Also, the body 12 includes a second transverse bore 38, see FIG. 7, including a diametrically reduced smooth end portion 40 on the right side of the body 12 and the rear end of the body 12 includes upper opposite side vertical lubrication bores 42 opening downwardly into the counterbores 20 and having lubrication fittings 44 threadedly secured in their upper end portions. Still further, the body 12 includes opposite side lower threaded vertical bores 44 opening upwardly into the counterbores 20 and including lower end diametrically enlarged counterbores 46 in which the diametrically enlarged head portions 48 of stop screws 50 threaded in the bores 44 are seated.

Figures 5, 18:
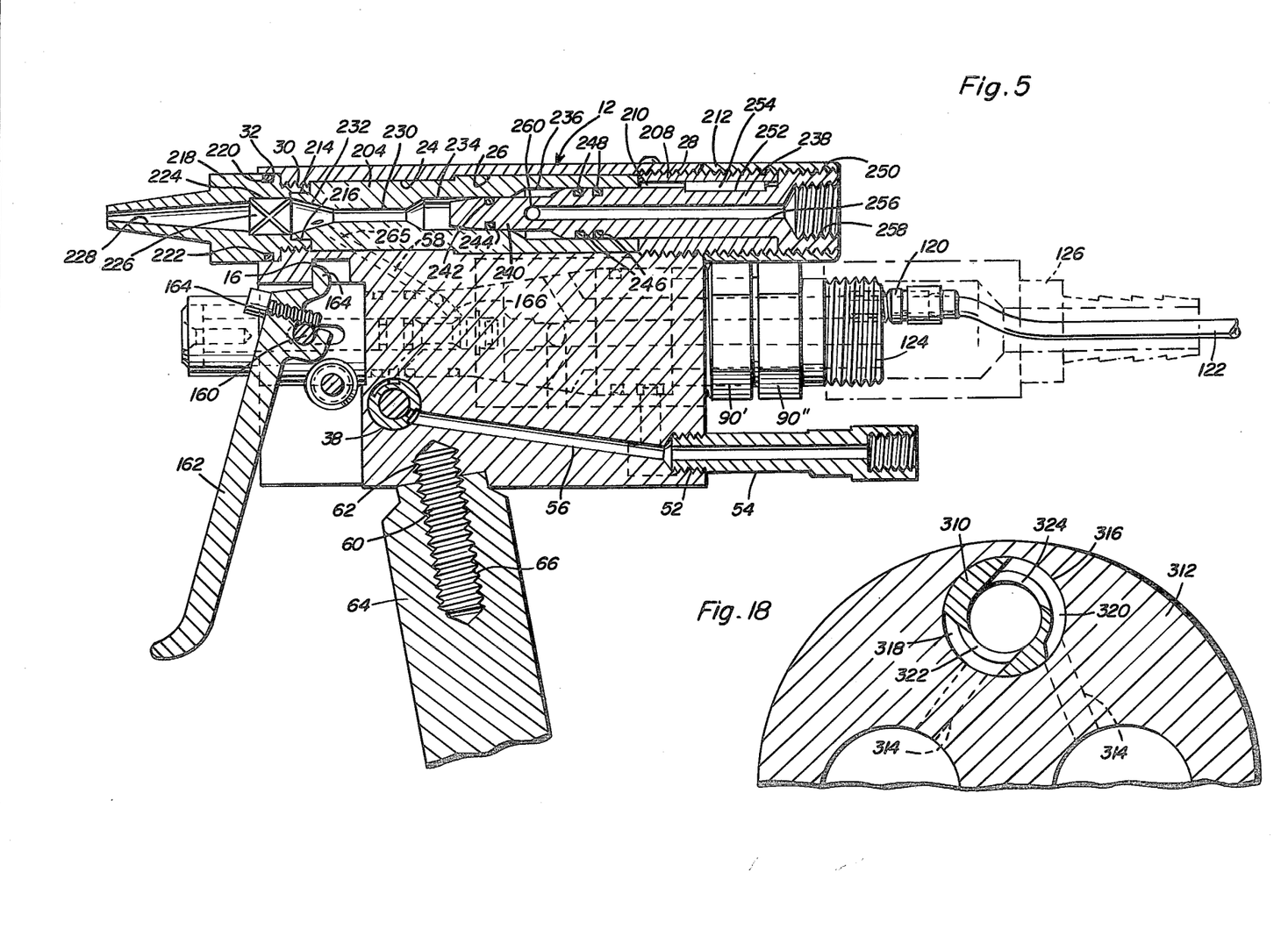
FIG. 5 is a fragmentary, longitudinal, vertical, sectional view taken substantially upon the plane indicated by the section line 5—5 of FIG. 3.
FIG. 18 is an enlarged, fragmentary, transverse, vertical sectional view similar to FIG. 6 but illustrating the modified form of impingement chamber sleeve mounted in the gun body and illustrating, in phantom line, the modified A and B material feed bores of the gun body leading into the modified form of impingement chamber sleeve of FIGS. 15, 16 and 17.
Figure 6:
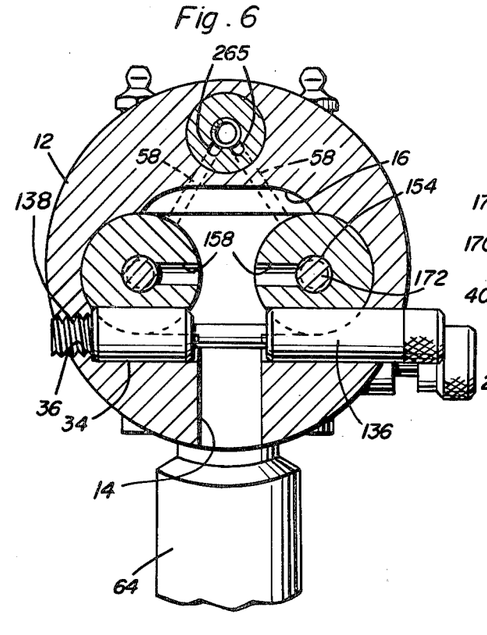
FIG. 6 is a transverse, vertical, sectional view taken substantially upon the plane indicated by the section line 6—6 of FIG. 4.

It will also be noted from FIG. 5 of the drawings that the rear central portion of the body 12 includes a threaded bore 52 formed therein opening rearwardly of the rear face of the body 12 and in which a solvent fitting extension 54 is threadedly engaged. A passage 56 is formed in the body 12 communicating the inner end of the threaded bore 52 and the bore 38.

From FIGS. 4, 5, 6 and 7 of the drawings, it will be further noted that the body 12 includes oppositely angled opposite side feed bore 58 formed therein communicating the upper inner side portions of the bores 18 with the lower opposite side portions of the bore 24. Also, a support stud 60 is threadedly engaged in a rearwardly and downwardly inclined lower bore 62 formed in the body 12 and the upper end of a tubular handle 64 has a longitudinal blind threaded bore 66 formed therein in which the downwardly projecting end of the stud 60 is threadingly received in order to rigidly support the handle 64 from the body 12.

Figure 1:
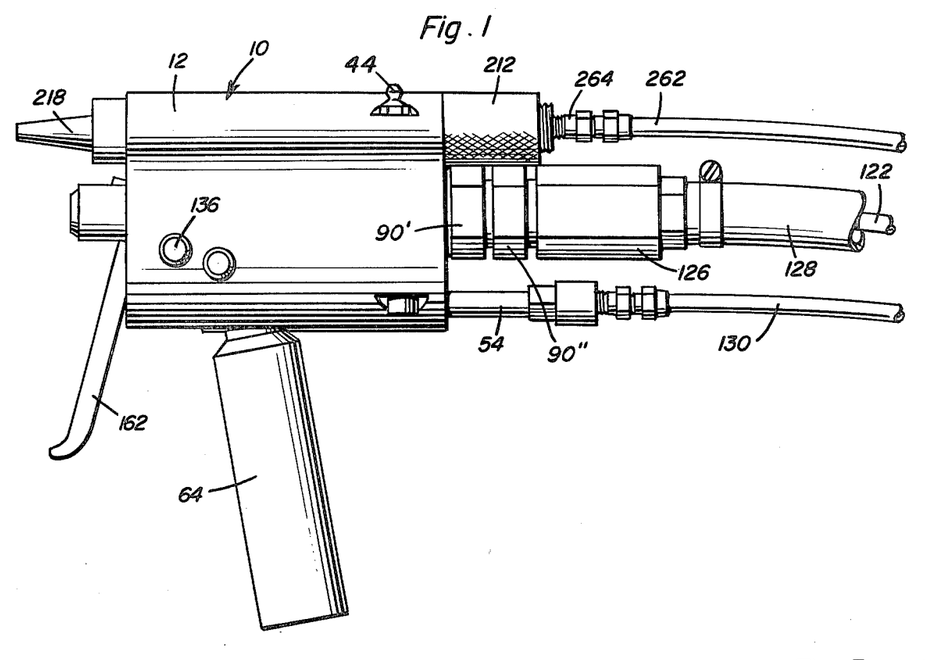
FIG. 1 is a side elevational view of a spray gun constructed in accordance with the present invention.
Figure 2:
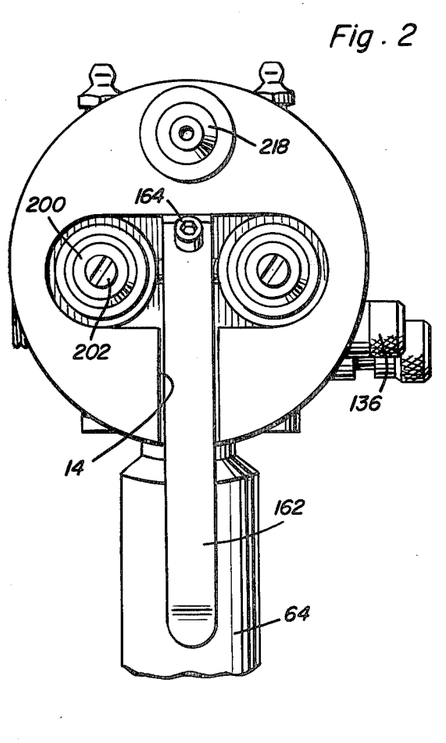
FIG. 2 is a fragmentary, enlarged, front elevational view of the gun.
Figure 3:
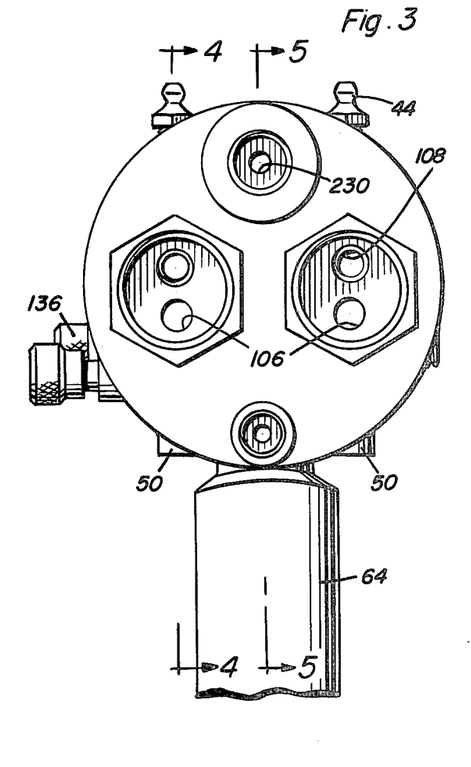
FIG. 3 is an enlarged, fragmentary, rear elevational view of the gun and with the material lines, air line and solvent line removed.
Figures 4, 17, 29:
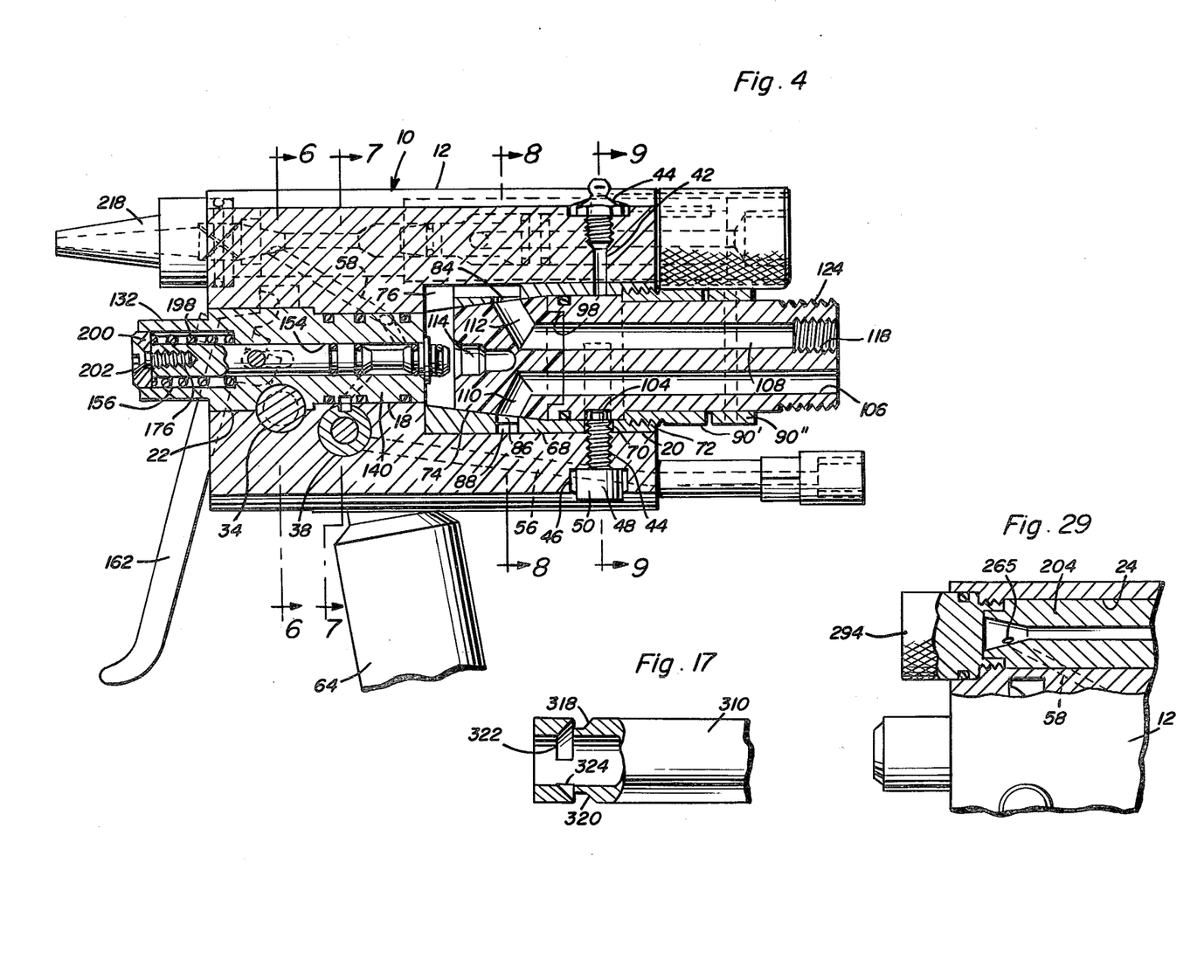
FIG. 4 is a fragmentary, longitudinal, vertical, sectional view taken substantially upon the plane indicated by the section line 4—4 of FIG. 3.
FIG. 17 is a fragmentary, enlarged, side elevational view of the forward end of the modified form of impingement chamber sleeve illustrated in FIG. 16 and with portions of the forward end of the modified form of the impingement chamber sleeve broken away and illustrated in longitudinal vertical section.
FIG. 29 is a fragmentary elevational view with parts broken away and illustrated in vertical section and showing the use of a holeless nozzle during periods of non-use of the gun.
Figure 8:
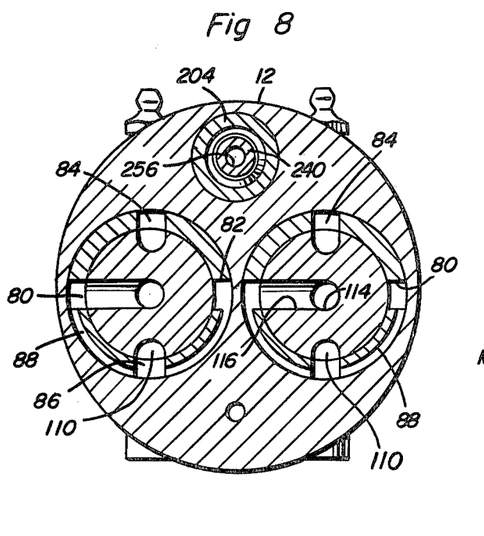
FIG. 8 is a transverse, vertical, sectional view taken substantially upon the plane indicated by the section line 8—8 of FIG. 4.
Figure 13:
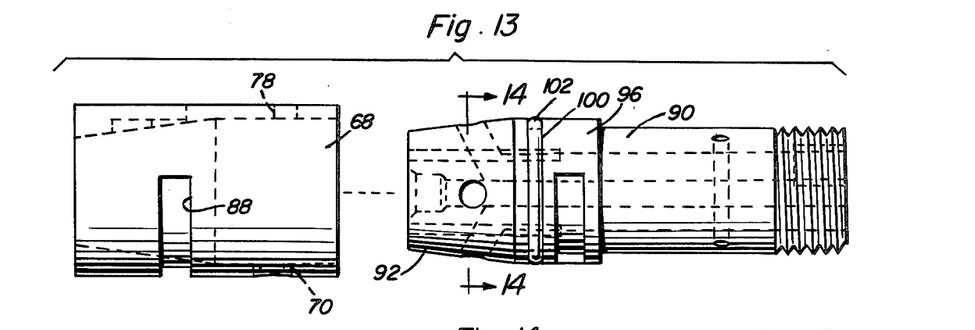
FIG. 13 is an exploded, side elevational view of one of the flow selector sleeves and the companion rotary flow selector valve.

A pair of flow selector sleeves 68, FIGS. 4 and 13, are seated in the counterbores 20 and have radial bores 70 formed therein through which the corresponding set screws 50 are received. The rear ends of the sleeves 68 are internally threaded as at 72 and the forward ends of the interiors of the sleeves 68 defined forwardly tapering seats 74 and include forwardly opening notches 76 disposed uppermost in the counterbores 20. The sleeves 68 are provided with radial bores 78 generally diametrically opposite the bores 70 and aligned with the lubrication bores 42 and the sleeves 68 include diametrically opposite forward end horizontal radial bores 80 and 82 and upper and lower diametrically opposite vertical radial bores 84 and 86 as well as one half circumferential grooves 88 communicating the corresponding bores 80, 82 and 86, see FIGS. 4, 8 and 13.

A pair of flow selector valves 90 are provided and include forwardly tapering forward end heads 92 pinned in position on the forward ends of the valves 90 by pins 94 and the valves 90 are generally cylindrical in configuration and include rearwardly facing shoulder defining enlarged forward end portions 96 provided with central recesses 98 in which the heads 92 are seated, see FIG. 4. In addition, the forward end portions 96 include circumferential grooves 100 in which O-rings 102 are seated.

Figure 9:
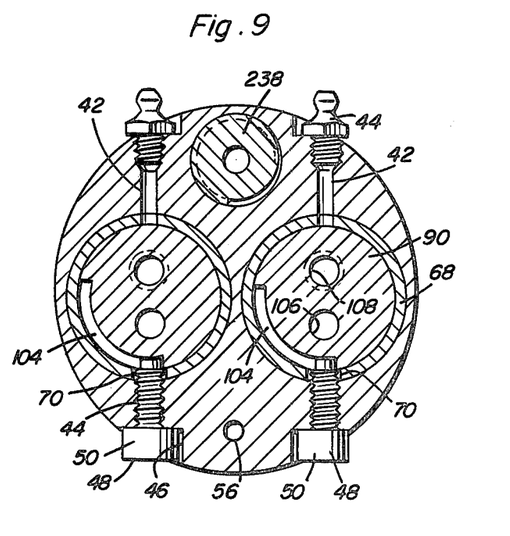
FIG. 9 is a transverse, vertical, sectional view taken substantially upon the plane indicated by the section line 9—9 of FIG. 4.
Figures 14, 16:
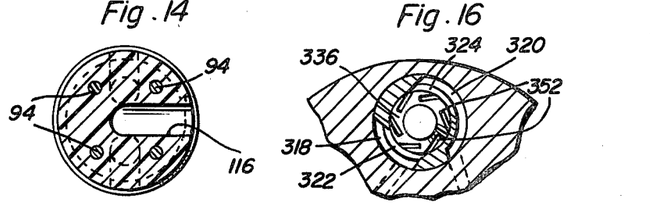
FIG. 14 is a vertical, transverse, sectional view taken substantially upon the plane indicated by the section line 14—14 of FIG. 13.
FIG. 16 is a fragmentary, transverse, sectional view taken substantially upon the plane indicated by the section line 16—16 of FIG. 15.

The forward end portions 96 of the flow selector valves 90 include one quarter circumferential grooves 104 in which the inner ends of the set screws 50 are received, see FIGS. 4 and 9, and the flow selector valves 90 also include rear end outwardly opening longitudinal bores 106 and 108 formed therein terminating inwardly in forwardly and outwardly inclined terminal ends 110 and 112, respectively. The valves 90 are rotatably received within the sleeves 68 with the forwardly tapering heads 92 seated in the forwardly tapering seats 74 of the interiors of the sleeves 68 and each flow selector valve 90 has a nut 90' threadedly engaged in the corresponding sleeve 68 therebehind and wrench engageable flow selector adjusting sleeves 90" are pined to the valves 90 for rotation thereof. Each head 92 includes a forward and central cavity 114 formed therein and a radial bore 116 opening into the cavity at its inner end and outwardly of the corresponding head 72, see FIGS. 4, 13 and 14. The outer ends of the terminal end portions 110 and 112 and the outer end of the bore 116 are registrable with the bores 84 and 86 and the outer end of the bore 116 is registrable with the bore 86. Further, the rear end of the bore 108 is internally threaded as at 118.

As may be seen from FIG. 5 of the drawings, each of the threaded rear ends 118 and the bores 108 has a line fitting 120 threadedly engaged therein and a supply line 122 has its discharge end removably coupled to the fitting 120. In addition, each of the flow selector valves 90 is externally threaded as at 124 on its rear end and has a hose fitting 126, see FIG. 1, threadedly engaged thereover, the fittings 120 being disposed within the corresponding fittings 126 and the supply lines 122 extending through the corresponding fittings 126. Each of the fittings 126 has a material return hose 128 secured thereover, each of the supply lines 122 extending through the corresponding return hose 128. Also, the rear end of the solvent fitting extension 54 has the discharge end of a solvent supply line 130 removably coupled thereto.

Figure 25:
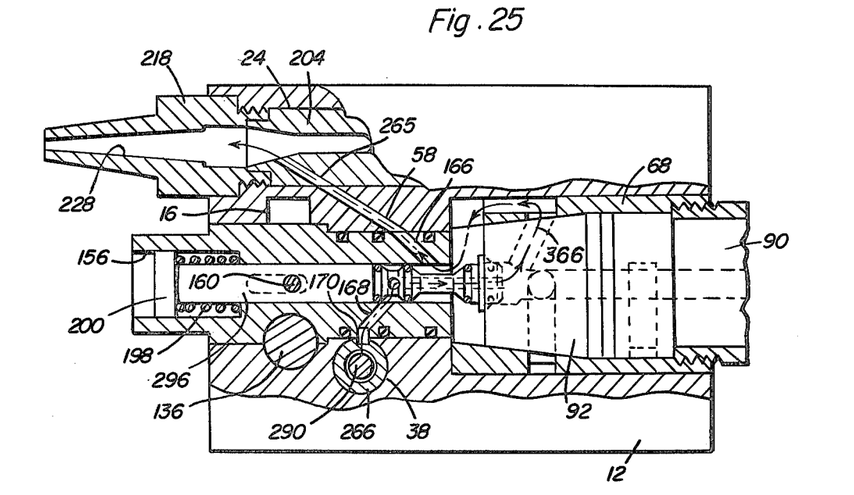
FIG. 25 is a fragmentary, side elevational view of the gun similar to FIGS. 19, 21 and 23 and with the flow selector valve in the off position, the flushing valve installed and shifted to the flushing position and the solvent valve in the on position.

Each bore 18 and counterbore 22 has a control valve sleeve 132 slidably received therein and each sleeve 132 is provided with a lower transverse semi-cylindrical notch 134 registered with the bore 34. The bore 34 has a transverse locking pin 136 disposed therein and the right hand end of the locking pin 136 is diametrically reduced and externally threaded as at 138 and is threadedly engaged in the end portion 36 of the bore 34, see FIGS. 4, 6 and 11. The sleeves 132 include inner diametrically reduced end portions 140 snugly received within the bores 18 and provided with three longitudinally spaced circumferential grooves 142, 144 and 146 in which O-rings 148, 150 and 152, respectively, are received. The intermediate portions of the sleeves 132 are seated within the counterbores 24 and the sleeves 132 include longitudinal bores 154 formed therethrough including diametrically enlarged forward end counterbores 156. Also, the sleeves 132 include opposite side longitudinally extending transverse slots 158 formed in adjacent sides thereof and a transverse pin 160 extends between and has its opposite ends slidably received within corresponding slots 158 of the sleeves 132, the midportion of the pin 160 having trigger 162 removably mounted thereon. The trigger 162 includes a fulcrum portion 164 received in the enlargement 16 and a set screw 164 removably secures the trigger 162 to the pin 160. Further, the sleeves 132 include upper upwardly and inwardly inclined bores 166 formed therein and a plurality of forwardly and downwardly inclined angularly displaced lower bores 168 formed therein and each sleeve 132 includes a partial circumferential groove 170 formed in its lower periphery into which the corresponding bores 168 open, see FIGS. 11, 25 and 26.

Figure 11:
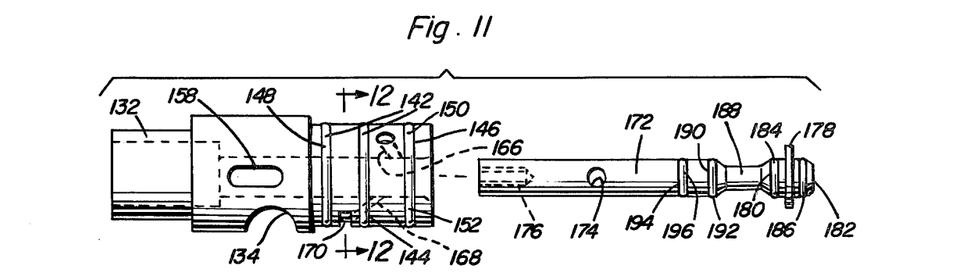
FIG. 11 is an exploded, side elevational view of one of the material controlling valves and the companion valve piston.
Figure 12:
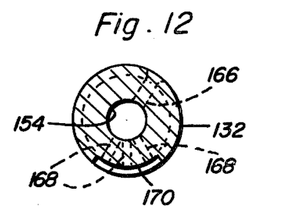
FIG. 12 is a vertical, transverse, sectional view taken substantially upon the plane indicated by the section line 12—12 of FIG. 11.

Each of the sleeves 132 has an elongated cylindrical valve piston 172 reciprocal therein, see FIGS. 4 and 11, and each valve piston 172 includes a transverse bore 174 in which the corresponding end of the pin 160 is snugly received. The forward end of each valve piston 172 includes a blind threaded bore 176 and the rear end of each piston 174 includes a radial circumferential flange 178 to the front and rear of which circumferential grooves 180 and 182 having O-rings 184 and 186 seated therein are formed. In addition, immediately forwardly of the groove 180 each valve piston 172 includes a diametrically reduced portion 188 forwardly of which a further circumferential groove 190 having an O-ring 192 seated therein is formed. Also, still another circumferential groove 194 is provided and spaced forward of the groove 190 and has an O-ring 196 seated therein.

A compression spring 198 is seated in each of the counterbores 156 and a valve piston head 200 is secured to the forward end of each valve piston 172 by means of a fastener 202 threadedly engaged in the corresponding blind bore 176 with the compression springs 198 seated in the counterbores 156 and bearing against the inner ends of the heads 200 and thereby yieldingly biasing the valve pistons 172 to their outermost positions in the bores 154 with the flanges 178 thereof abutted against the rear faces of the valve sleeves 132 about the rear ends of the bores 154.

Figure 10:
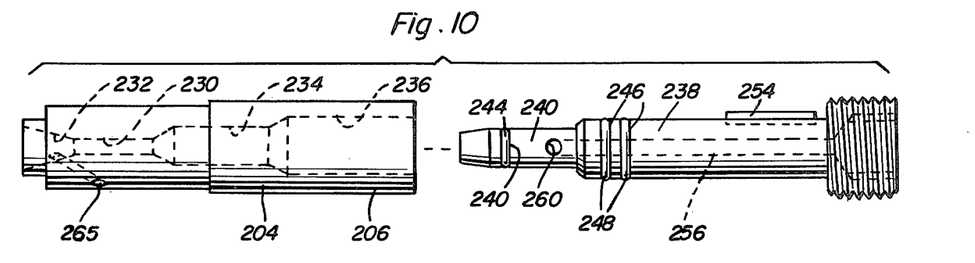
FIG. 10 is an exploded, side elevational view of a first form of impingement chamber and associated air valve.

With attention invited more specifically to FIGS. 5 and 10 of the drawings, it may be seen that an impingement chamber defining sleeve 204 is provided and includes a diametrically enlarged rear end portion 206. The sleeve 204 is seated in the bore 24 with the diametrically enlarged rear end portion 206 thereof seated in the first counterbore 26. An externally threaded air valve bushing 208 is threaded into the second counterbore 28 behind the sleeve 204 and includes an internal keyway 210. An air valve nut 212 is threaded onto the rear end of the air valve bushing 208 rearwardly of the body 12 and the forward end of the sleeve 204 is diametrically reduced as at 214 and is seatingly received within a rearwardly opening counterbore 216 formed in the rear end of a spray nozzle 218 threaded into the threaded counterbore 30, the nozzle 218 including a circumferential groove 220 in which an O-ring 222 is seated with the O-ring 222 seating the nozzle 218 relative to the counterbore 32, see FIG. 5.

The nozzle 218 has a bore portion 224 formed in its rear end forwardly of the recess 216 and a teflon coated cylindrical mixer 226 is seated within the bore portion 224 forwardly of the diametrically reduced portion 214 of the sleeve 204. Also the bore portion 224 includes a forwardly tapering portion 228 opening outwardly through the forward end of the nozzle 218.

The sleeve 204 includes a longitudinal bore 230 formed therein whose forward end portion is flared as at 232 and opens outwardly of the forward end of the sleeve 204. The rear end of the bore 230 includes a first diametrically enlarged counter bore 234 and the rear end of the counterbore 234 opens into a second enlarged counterbore 236. A cylindrical air valve 238 is provided and includes a diametrically reduced forward end 240 provided with a circumferential groove 242 equipped with an O-ring 244 and the air valve 238 additionally includes a pair of longitudinally spaced circumferential grooves 246 rearward of the diametrically reduced forward end portion 240 thereof and equipped with O-rings 248. Also, the rear end portion of the air valve 238 is diametrically enlarged and externally threaded as at 250 and includes a longitudinal keyway receiving recess 252 forward of the diametrically enlarged portion 250 in which an elongated key 254 is received. The air valve 238 includes a longitudinal bore formed therein including a rear diametrically enlarged threaded counterbore 258 opening rearwardly outwardly of the air valve 238 and the forward end of the bore 256 terminates in the diametrically reduced forward end portion 240 of the air valve 238 and communicates with a pair of diametrically opposite radial bores 260 formed in the air valve 238. The discharge end of an air supply line 262 is removably coupled to the rear end of the air valve 238 by means of a fitting 264 threadedly engaged in the counterbore 258. The externally threaded diametrically enlarged end portion 250 of the air valve 238 is threaded into the rear end of the air valve nut 212 and the diametrically enlarged end portion of the air valve 238 abuts against the rear end of the air valve bushing 208. Further, the key 254 is slidingly received in the keyway 210. Also, the sleeve 204 includes a pair of upwardly and forwardly inclined and convergent bores 265 formed therein opening into the forward end portion 232 of bore 230 at their upper ends and registered with the upper ends of feed bores 58 at their lower ends.

Figure 7:
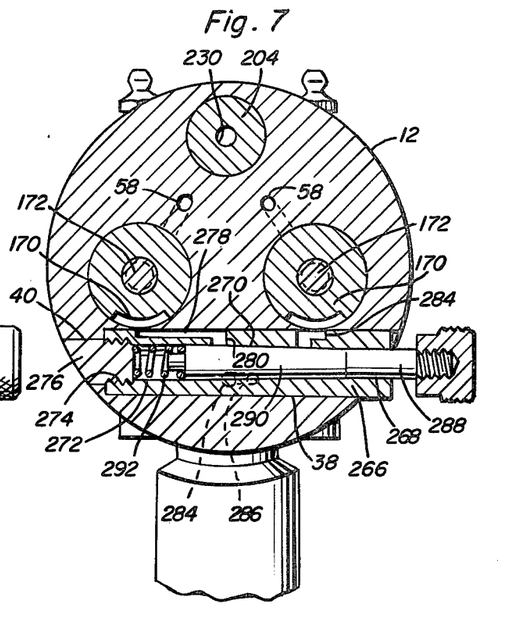
FIG. 7 is a transverse, vertical, sectional view taken substantially upon the plane indicated by the section line 7—7 of FIG. 4.
Figure 26:
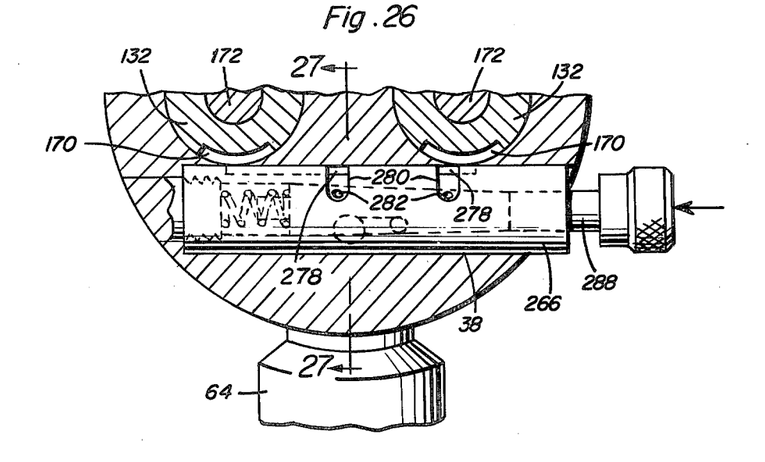
FIG. 26 is a fragmentary, enlarged, transverse, vertical sectional view similar to the lower portion of FIG. 7 but with the solvent valve sleeve illustrated in elevation.
Figure 27:
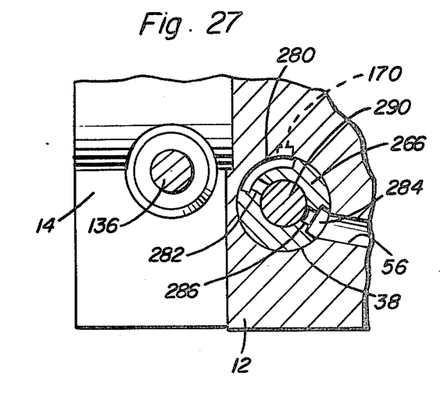
FIG. 27 is a fragmentary, longitudinal, vertical sectional view taken substantially upon the plane indicated by the section line 27—27 of FIG. 26.

With attention now invited more specifically to FIGS. 7, 26 and 27 of the drawings, it may be seen that a solvent valve sleeve 266 is seated within the bore 38. The exterior of the sleeve 266 is cylindrical and the sleeve 266 has a longitudinal bore 268 formed therethrough, including an intermediate tapered portion 270 which tapers, slightly, toward the left side of the body 12 and terminates at is large diameter end in an enlarged cylindrical end portion 272 having its terminal end threaded as at 274. A plug 276 is received in the end portion 40 of the bore 38 and includes a threaded inner end threadedly engaged in the threaded portion 274 of the bore 268, whereby the sleeve 266 is removably retained in the bore 38.

The sleeve 266 includes a pair of long and short longitudinal exterior grooves 278 formed in opposite ends thereof communicating with the grooves 170 of the sleeves 132 and the adjacent ends of the grooves 278 open into the tapered portion 270 of the bore 268 through circumferential grooves 280 and radial bores 282. The sleeve 266 further includes a longitudinal groove 284 formed in its exterior and with which a radial bore 286 opening into the slightly flaring portion 270 of the bore 268 is communicated, the groove 284 being communicated with the passage 56. A solvent valve 288 is slidingly received through the bore 268 and includes a slightly tapered inner end portion 290 seated in the slightly tapered portion 270 of the bore 268 and a compression spring 292 is disposed within the enlarged portion 272 of the bore 268 between the plug 276 and the valve 290 and thereby urges the latter to the right as viewed in FIG. 7 of the drawings with the tapered portion 290 thereof snugly seated in the tapered portion 270 of the bore 268. Upon inward displacement of the valve 288 against the biasing action of the spring 292, the valve 288 will be displaced to the left as viewed in FIG. 7 of the drawings, whereby the outlet end of the bore or passage 56 will be communicated with the grooves and bores 280, 284, 282 and 286, thereby enabling solvent to pass upwardly into the grooves 170 of the sleeves 132 and through the bores 168 into the bores 154, the bores 166, the bores 58, the bores 265 and into the interior of sleeve 204.

Figure 28:
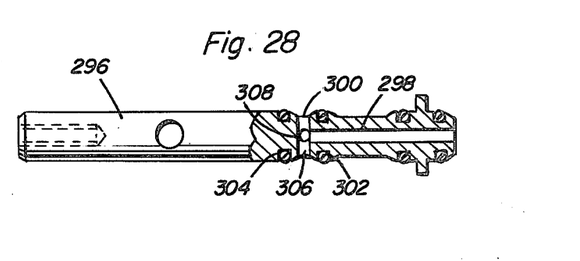

With attention now invited more specifically to FIG. 29 of the drawings, there may be seen a blank or holeless nozzle 294 which may be used during periods of non-usage of the gun 10 in lieu of the nozzles 218. Also, FIG. 28 illustrates a flush and store valve piston 296 which is substantially identical to the piston 172 illustrated in FIG. 11, except that the piston 296 includes a longitudinal blind bore 298 formed in the rear end thereof, a diametrically reduced portion 300 intermediate the grooves 302 and 304 corresponding to the grooves 190 and 194 and crossed and intersecting diametric bores 306 and 308 formed in the diametrically reduced portion 300. The piston 296 is to be utilized as a flush and store valve piston in lieu of each piston 172.

Referring now more specifically to FIGS. 15 through 18, there may be seen a modified form of impingement chamber defining sleeve 310 to be used in conjunction with a slightly modified spray gun body 312 including slightly differently inclined bores 314 corresponding to the bores 58. The upper ends of the bores 314 open into the bore 316 of the body 12 corresponding to the bore 24. The bores 314 open into the bore 316 in a manner whereby the fluent material discharged into the bore 316 from the bores 314 tends to swirl about the bore 316 in a counterclockwise direction as viewed in FIG. 18 of the drawings. The sleeve 310 includes diametrically opposite circumferentially extending grooves 318 and 320 formed therein with the grooves 318 and 320 inclined inwardly toward the forward end of the sleeve 310 and opening into circumferential slots 322 and 324. The slot 322 is of generally the same angular extent as the corresponding groove 318, but the slot 324 is of an angular extent of only approximately ninety degrees whereas the groove 320 is of approximately 120 degrees angular extent. The discharge ends of the bores 314 and the grooves and slots 318, 320 and 322, 324 coact to impart a counterclockwise swirling rotation to the A and B fluent compounds within the sleeve 310 as viewed in FIG. 18 of the drawings.

The sleeve 310 includes a single bore 326 extending therethrough corresponding to the bore 236, but the bore 326 includes a diametrically enlarged midportion 328. The air valve utilized in conjunction with the sleeve 310 in lieu of the air valve 238 is referred to in general by the reference numeral 330 and includes front and rear diametrically reduced portions 332 and 334 spaced longitudinally therealong. The diametrically reduced portion 332 is disposed slightly rearwardly of the forward end of the air valve 330 and defines an axially short head 336 on the forward end of the air valve 330. In addition, the portion 338 of the air valve 330 disposed between the diametrically reduced portions 332 and 334 includes a circumferential groove 340 having an o-ring 342 seated therein. Also, the portion of the air valve 330 spaced closely rearwardly of the diametrically reduced portion 34 includes a pair of longitudinally spaced circumferential grooves 344 having O-rings 346 seated therein. FInally, the bore 348 of the air valve 330 corresponding to the bore 256 of the air valve 238 terminates at its forward end in four circumferentially spaced forwardly and outwardly inclined terminal ends 350 opening into the rear portion of the groove defining the diametrically reduced portion 334. Also, the head 336 includes circumferentially spaced similarly angled peripheral slots 352 formed therein which tend to swirl the air passing through the slots 352 in a clockwise direction within the bore 326 forwardly of the head 336 as viewed from the rear end of the bore 326. Further, it will be noted that the head 336 is disposed rearwardly of the slots 322 and 324.

Figure 15:
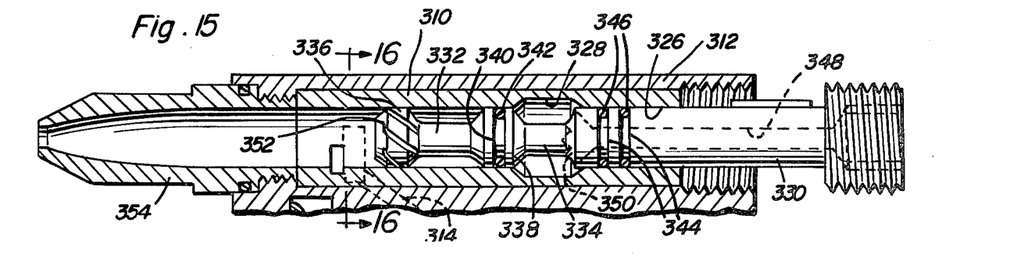
FIG. 15 is a fragmentary, longitudinal, vertical sectional view of the upper central portion of the gun illustrating a modified form of impingement chamber sleeve and associated air valve as well as a companion spray nozzle.

The companion sleeve 310 and air valve 330, because of the angulation of the bores 314, the grooves 318, 320 and the slots 322 and 324 as well as the slots or grooves 352, function to more thoroughly admix the components A and B with each other and the air passing through the sleeve 310 and, therefore, do not require the equivalent of the mixer 226 of the nozzle 218. Accordingly, a modified form of nozzle 354 is utilized in lieu of the nozzle 218.

In order to reduce weight, substantially all of the working components of the gun 10, except for the sleeve 266 as well as the head 92 may be formed of aluminum and "Teflon" anodized (exluding, of course, the compression spring 198 and the various O-ring seals and the fittings 44). The aforementioned sleeves may be formed of "Teflon" and the head 92 may be formed of "Delrin".

Figures 19, 20:
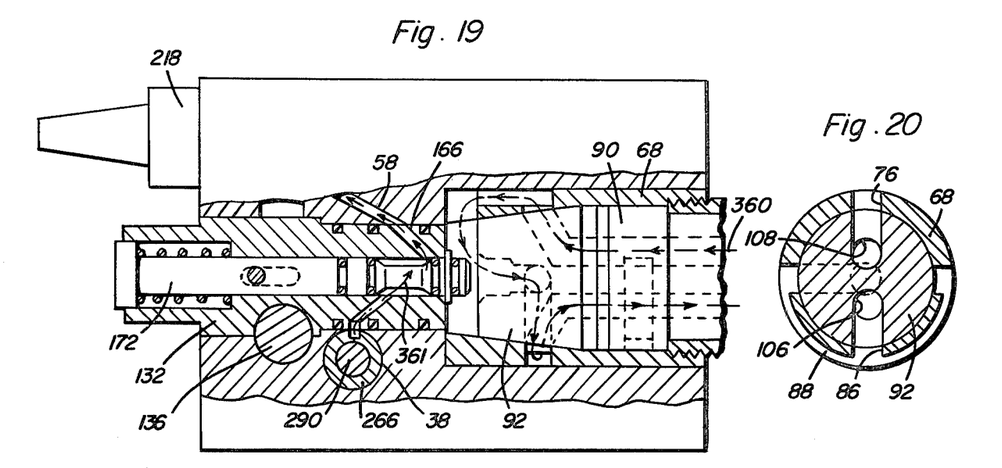
FIG. 19 is a fragmentary, side elevational view of the gun body with portions thereof being broken away and illustrated in vertical section and with one of the flow selector valves in the on position, the associated controlling valve piston in the closed position and the solvent flow path when the solvent value is in the on position.
FIG. 20 is a vertical, transverse, sectional view of the flow selector valve and sleeve illustrated in FIG. 19.

In operation, and with attention directed now more specifically to FIGS. 19 through 25 of the drawings, when the flow selector valves are in the "on" positions and the valve pistons 172 are in their forwardmost closed positions, the components A and B flow through the corresponding flow selector valves and sleeves 90 and 86 in the direction of the arrows 360 in FIG. 19. The components A and B are pumped from the supply therefor through the valves and sleeves 90 and 68 and back to the supply. Also, FIG. 19 illustrates the flow of solvent at 361 when the valve pistons 172 are returned to their "off" positions at the end of a spraying operation and the solvent valves 288 are shifted to their "on" positions, whereby the bores 166 and 265 as well as the nozzles 218 may be flushed.

Figures 21, 22:
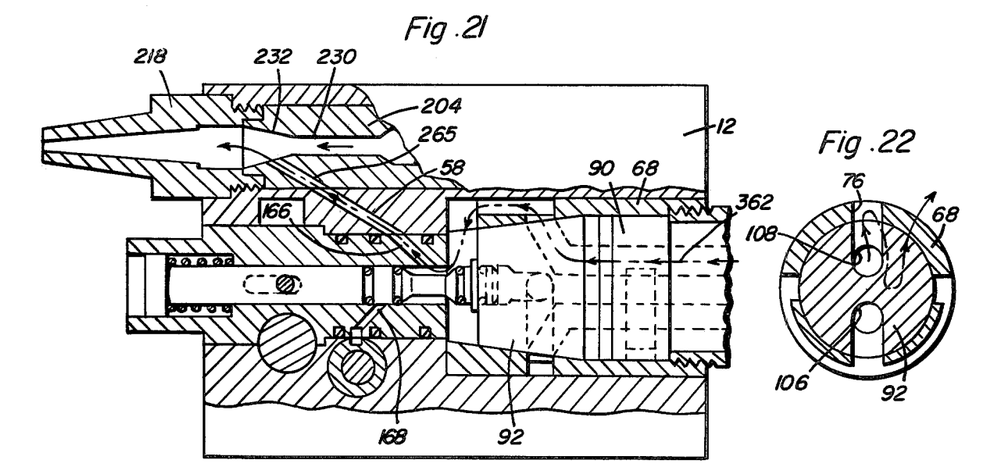
FIG. 21 is a fragmentary, side elevational view, with parts broken away and illustrated in longitudinal vertical section, similar to FIG. 19 but illustrating the material controlling valve piston in the on or open position.
FIG. 22 is a transverse, vertical sectional view of the flow selector valve and sleeve illustrated in FIG. 21.

When the flow selector valves are rotated to the "on" positions thereof and the trigger 162 is actuated to shift the valve pistons 172 rearwardly toward their open positions, the components A and B flow through the gun 10 in the direction of the arrows 362 in FIGS. 21 and 22 of the drawings, the flanges 178 of the pistons 172 seating against the forward faces of the valves 90 about the cavities 114.

Figure 23:
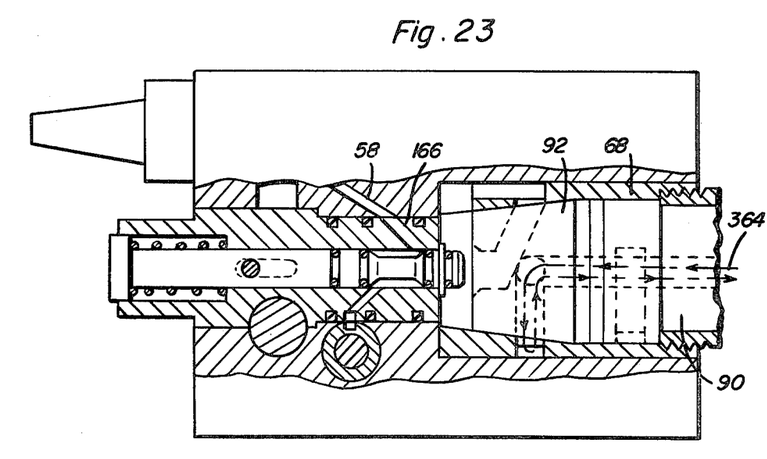
FIG. 23 is a fragmentary, side elevational view of the gun similar to FIGS. 19 and 21 and with parts being broken away and illustrated in longitudinal vertical section and the flow selector valve in the off position.
Figure 24:
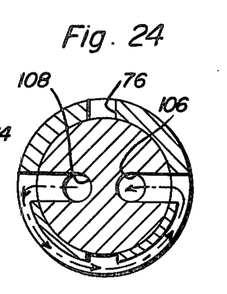
FIG. 24 is a transverse, vertical sectional view of the flow selector valve and sleeve illustrated in FIG. 23.

When the flow selector valves 90 are in the "off" positions, the components A and B flow from the supplies thereof through the gun 10 in the direction of the arrows 364 in FIGS. 23 and 24 and back to the supplies for the components A and B. Finally, when the flow selector valves 90 are in the "off" positions and the standard material dispensing valves 172, which are used for during actual spraying operations, are replaced with the store-flush valves 296 and the trigger 162 is actuated to shift the valve pistons 296 rearwardly toward their open positions, and the solvent valve 288 is inwardly depressed against the biasing action of the spring 292, solvent flows through the fitting 54, the bore 56, and into bore 38 and then through the bores 168, the valve pistons or rods 172 and the bores 166, 58 amd 233, and into nozzle 218 in the manner indicated by the arrows 366 in FIG. 25. After flushing, trigger is released and valve pistons 296 return to the closed position, the gun is tipped with the nozzles pointing upright, the solvent button is again depressed and solvent flows through the valves as in FIG. 19. After the internal passages are filled with solvent, the gun is capped off with the holeless nozzles 294, FIG. 29, which will maintain the solvent within the gun during extended periods of nonuse.

The elements of the gun 10 which handle the flow of the components A and B to be pumped through the gun are constructed in a manner whereby leakage of the components A and B within the gun into intermixing relation with each other (other than in the air valve sleeve) is eliminated. Any leakage of the components A and B about the flow selector valves 190 due to their being slightly axially displaced rearwardly when the nuts 90' are loosened in order to enable the flow selector valves 90 to be rotated by means of the adjusting sleeves 90" may be offset by injecting grease into the sleeves 68 about the valves 90 through the fittings 44.

It will be noted that the bores 58 annd 265 are straight, aligned and extend in a direction registered with the front end of sleeve 204 and, therefore, when the nozzle 218 is removed a wire or twist drill may be used, through the front end of the sleeve 204, to unclog the bores 58 and 265, if clogging thereof is experienced.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A device for mixing and dispensing fluent materials, said device including a body defining an elongated dispensing chamber therein opening, at one end, outwardly to the exterior of said body, said body further defining a pair of material receiving chambers therein for receiving different fluent materials under pressure into said body, said body defining a pair of material flow passage means therein communicating said material receiving chambers and said dispensing chamber, a pair of control valves in said body for controlling the flow of material through said material flow passage means from said material receiving chambers into said dispensing chamber, a pair of flow valve means in said material receiving chambers each including a material inlet passage and a material outlet passage for return of unused material from the corresponding inlet passage to the source of supply of said material from which the latter flows under pressure to said inlet passage, said control valves including means for selectively communicating and terminating communication between the corresponding receiving chamber and said dispensing chamber through the corresponding material flow passage means, said flow valve means each including means for selectively communicating the corresponding inlet passage with the corresponding outlet passage through the corresponding receiving chamber, communicating the corresponding inlet passage with the corresponding outlet passage independent of the corresponding receiving chamber and communicating the corresponding inlet passage with the corresponding receiving chamber, said flow passage means including discharge ends opening into said dispensing chamber in directions convergent toward said chamber from opposite sides thereof and inclined at an obtuse angle opening toward said one chamber end, air inlet means operative to admit air under pressure into the other end of said dispensing chamber, and throttle means within said chamber upstream from said discharge ends operative to variably throttle air flow through said dispensing chamber toward said discharge ends and to restrict the flow of air in said chamber past said throttle means to individual peripherally spaced convolution segment flow paths for effecting a swirling uniting of said individual flow paths downstream from said throttle means in substantial registry with said discharge ends.

2. The combination of claim 1 wherein said control valve means includes means operative, in conjunction with said flow valve means and upon communication between said receiving chamber and said dispensing chamber by said control valve means to block communication between said receiving chamber and said outlet passage.

3. The combination of claim 2 wherein said body also defines a solvent passage therein including a solvent inlet portion and a solvent outlet portion opening into said material passage means, solvent valve means operatively associated with said solvent passage means for selectively establishing and terminating communication between said inlet and outlet portions of said solvent passage means.

4. The combination of claim 1 wherein said body includes means operative to selectively communicate said material passage means, at the end thereof remote from said dispensing chamber, with a source of solvent under pressure.

5. The combination of claim 4 including means operative to selectively close said dispensing chamber to the exterior of said body.

6. The combination of claim 1 wherein said dispensing chamber is elongated and one end thereof opens outwardly to the exterior of said body, a spray nozzle removably secured in said one end of said chamber, said material passage means being straight and extending in a direction aligned with said one end of said dispensing chamber, whereby a straight tool may be inserted into said material passage means from the exterior of said body through said one end of said dispensing chamber upon removal of said spray nozzle and for cleaning said material passage means with said tool in the event of clogging of said material passage means.

7. A device for mixing and dispensing fluent materials, said device including a body defining an elongated dispensing chamber therein opening, at one end, outwardly to the exterior of said body, said body further defining a pair of material receiving chambers therein for receiving different fluent materials under pressure into said body, said body defining a pair of material flow passage means therein communicating said material receiving chambers and said dispensing chamber, a pair of control valves in said body for controlling the flow of material through said material flow passage means from said material receiving chambers into said dispensing chamber, a pair of flow valve means in said material receiving chambers each including a material inlet passage and a material outlet passage for return of unused material from the corresponding inlet passage to the source of supply of said material from which the latter flows under pressure to said inlet passage, said control valves including means for selectively communicating and terminating communication between the corresponding receiving chamber and said dispensing chamber through the corresponding material flow passage means, said flow valve means each including means for selectively communicating the corresponding inlet passage with the corresponding outlet passage through the corresponding receiving chamber, communicating the corresponding inlet passage with the corresponding outlet passage independent of the corresponding receiving chamber and communicating the corresponding inlet passage with the corresponding receiving chamber, said receiving chambers comprising elongated bores opening outwardly of said body at one pair of corresponding ends thereof, said material flow passage means being defined in part by small diameter bores defined in said body and including one pair of ends coaxial with and opening into the other pair of corresponding ends of said receiving chamber bores, a pair of valve sleeves disposed in and spaced from the terminal ends of said other pair of corresponding ends of said receiving chamber bores and including tapered seat portions opening toward said one pair of corresponding ends of said receiving chamber bores, said flow valves including conical surfaces rotatably seated on said seat portions, said control valves each including a elongated spool valve axially shiftable in the corresponding small diameter bore, said flow valves each including an axially outwardly opening central passage bore concentric with and spaced from the corresponding small diameter bore, said spool valves each including a first end opposing the corresponding central passage bore, each spool valve first end including axially spaced O-ring equipped portions and a diametrically enlarged portion therebetween, said enlarged portions each being shiftable, but captive, between the adjacent ends of the corresponding small diameter bore and central passage bore, said O-ring equipped portions being alternately axially displaceable into said corresponding central passage and small diameter bores.

8. The combination of claim 7 wherein said flow valves each include O-ring seals seatingly engaged in the corresponding elongated chamber bore upstream from said tapered seat portions, and said body including lubrication injection passage means opening into each of said chamber bores upstream from said flow valve O-ring.

* * * * *